April 19, 1932. J. G. FALLOU 1,854,333
CONNECTION FOR FEEDING WATTMETRICAL RELAYS
ADAPTED TO PROTECT ELECTRIC MAINS
Filed Nov. 3, 1927
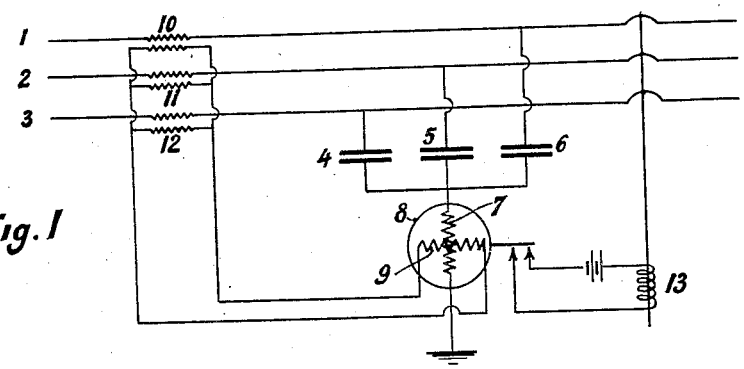
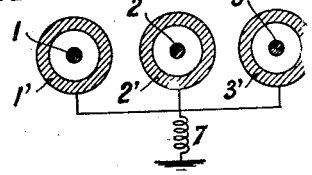
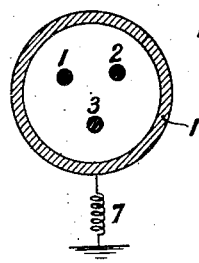
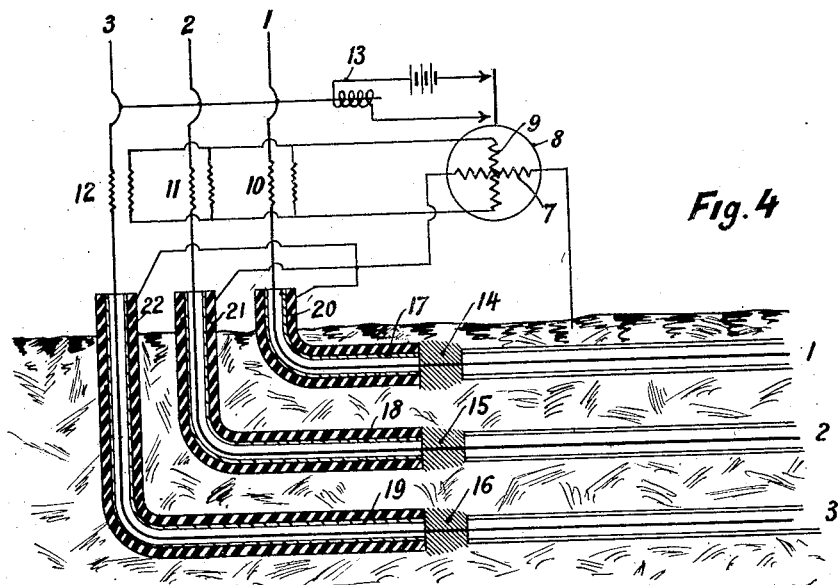

Patented Apr. 19, 1932

1,854,333

UNITED STATES PATENT OFFICE

JEAN GUSTAVE FALLOU, OF PARIS, FRANCE, ASSIGNOR TO UNION D'ELECTRICITE, OF PARIS, FRANCE, A COMPANY OF FRANCE

CONNECTION FOR FEEDING WATTMETRICAL RELAYS ADAPTED TO PROTECT ELECTRIC MAINS

Application filed November 3, 1927, Serial No. 230,884, and in France June 3, 1927.

Most of the damage which may occur in high voltage mains is due to the grounding of a phase which produces a short circuit when the neutral point has been grounded.

Actually, the custom is spreading of protecting high voltage lines by selective devices only for the most common case of the grounding of one or two phases. The short-circuits between phases insulated from ground, which are extremely rare, are eliminated by ammetrical non selective relays.

To protect lines between the connections with earth, it is natural to use only one single relay for all phases and to make the asymetrical residual component of the currents and voltages act on this relay.

It is known that, when a three phase feeder becomes faulty, the potential and intensities may be no more represented by a system of three equal vectors shifted at 120° between themselves, but by:

(a) Two systems of three equal vectors shifted at 120° and turning in opposite directions and termed direct symetrical and reverse symetrical components:

(b) A single vector termed asymetrical or residual component having a value equal to the third of the sum of the corresponding vectors, for instance the residual vector $U_o$ corresponding to the potentials $U_1$, $U_2$, $U_3$ between the wires and the ground shall have a value:

$$U_o = \tfrac{1}{3}(U_1 + U_2 + U_3).$$

The selective devices now in use require most generally the use of wattmeter relays, which comprise a current winding and a voltage responsive winding.

These devices require therefore the feeding of the relays with two currents proportional respectively to the residual components of the currents in the different phases and of the differences of potential between the different phases and the ground.

Said currents, proportional to the residual components, are generally obtained by transformers, but it has been already proposed to obtain the potential component by means of condensers, one armature of which is connected to the wire or is constituted by the wire itself, the other armature being grounded by intermediary of the primary winding of a transformer whose secondary winding is connected with the voltage responsive winding of the relay, or of the winding itself.

Such a device is diagrammatically shown on Figure 1 for explanatory purposes.

On said figure, 1, 2, 3 are the wires of the line, assumed to be a threephase one, the wattmeter relay 8, when energized, feeds with current the coil 13 of a circuit breaker, the current responsive winding 9 of the relay is fed by intermediary of the transformers 10, 11, 12 and the voltage responsive winding 7 is grounded by one of its ends while the other end is connected with the first armatures of three condensers 4, 5, 6 whose second armatures are respectively connected to the wires 1, 2, 3.

The working of this device is easy to understand.

It is obvious that the winding 9 is fed with a current proportional to the sum of the currents flowing in each of the phases.

As said above, let us call $U_1$, $U_2$, $U_3$ the potentials of the wires with reference to the ground, and C the capacity of each of the similar condensers 4, 5, 6; let us assume further that the frequency of the potentials is $f$ and its pulsation $w$ ($w = 2\pi f$).

Thus, we have:

$$U_1 = V_1 \sin wt.$$
$$U_2 = V_2 \sin (wt + 120°)$$
$$U_3 = V_3 \sin (wt + 240°)$$

Besides, we know that, if a condenser whose capacity is C, is submitted to a difference of potential $v$ between its armatures; its charge and discharge current is:

$$i = C\frac{dv}{dt}$$

therefore, the current in the circuit of the first condenser 4 shall be:

$$i_1 = C\frac{dU_1}{dt} = CwV_1 \cos wt$$

We shall have the same for the currents $i_2$ and $i_3$ of the second and third condensers and therefore the total current I flowing across the winding 7 shall be:

$$I = Cw(V_1 \cos wt + V_2 \cos(wt + 120°) + V_3 \cos(wt + 240°))$$

It is obvious, by last formula, that I may be represented by a vector shifted at 90° with the vector representing the vectorial sum of $U_1 + U_2 + U_3$ and that the size of I is equal to the size of said last vector multiplied by $Cw$.

Consequently, referring to what was said above about the residual component $U_o$, we see that we have $$1/\text{size } I = 3Cw \times \text{size } U_o$$

the shifting between the vectors I and $U_o$ being 90°.

If the line is balanced, $U_o$ is zero and there is no current in the winding 7, but if a fault occurs $U_o$ takes a certain value and therefore I takes also a value which depends on the capacity C.

It is then necessary to provide condensers having a large capacity, which it is easy to calculate if $i_m$ is the minimum current liable to make the relay work, and $U_{om}$ the minimum value of the residual component for which the circuit breaker is desired to work, we ought to have:

$$i_m = 3Cw\, U_{om}$$

and consequently:

$$C = \frac{i_m}{3wU_{om}}$$

The present invention has for its object, in electrical systems including conductors a portion of which pass underground, to use as armatures for the condensers 4, 5, 6, on one hand the wires themselves, and on the other hand the metallic armouring of the cable or cables, say the lead covering; Figure 2 shows diagrammatically how the invention can be practically executed when the line is constituted by three single core cables having metallic covering 1', 2', 3', these latter being connected with one end of the winding 7 whose other end is grounded; Figure 3 shows, also diagrammatically, how the invention can be performed with a three cores cable having a single metallic armouring which is connected in the same way with the winding 7.

It is obvious that the part of the metallic armouring used as a condenser armature must be insulated from the ground; this is easy to do, say by covering said part with an insulating tape or sheathing.

By way of example, Figure 4 shows an embodiment of the invention.

Figure 4 is concerned with a feeder constituted with three single core underground cables.

At the end of the feeder, the armourings are severed at a few meters from the end at 14, 15, 16, the sections 17, 18, 19 of the armourings are insulated from the ground by convenient sheathings 20, 21, 22 and the metallic parts of said armourings are connected to winding 7 of the wattmeter relay 8, the second end of which is earthed; the second winding 9 being for instance connected with transformers in the manner shown in Fig. 1.

With such device, the metallic part of the armouring comprised between 14, 15, 16 and the end of the feeder act as the first armatures of the condensers 4, 5, 6 shown on Figure 1.

It is interesting to note:

1st; that, with such devices, it is always possible to reach, for the condensers capacity, the minimum value necessary for working in the desired conditions, said minimum value has been calculated above, the capacity of an armoured cable being proportional to its length, it shall be always possible to obtain for it the desired value by severing the armouring (as in Figure 4) at a sufficient distance of the end of the cable, in order to have between said end and the points 14, 15, 16 a great enough length of cable.

2nd; the impedance of the relays being always negligible with reference to the impedance of the capacities, the current in the winding 7 of the relay will be shifted by 90° reference to the residual component of the voltages, so the currents in windings 7 and 9 will be nearly in phase; this will ensure the maximum sensibility for wattmetrical relays of the electrodynamic types.

What I claim is:

In an electrical system including conductors, a portion of which pass underground, each of the conductors passing underground being surrounded by an armoured cable severed near one end, a circuit breaker for the conductors and means to control the same upon a ground fault on any one of the conductors including a wattmeter responsive relay which comprises a current winding and a voltage responsive winding, the former being energized from the system in accordance with the residual current of the system, one end of the voltage winding being grounded while the other end is connected to the armoured portions of the conductors.

In testimony whereof I have affixed my signature.

JEAN GUSTAVE FALLOU.